(12) United States Patent
Soltani et al.

(10) Patent No.: US 11,754,865 B2
(45) Date of Patent: Sep. 12, 2023

(54) HETERGENOUS INTEGRATION AND ELECTRO-OPTIC MODULATION OF III-NITRIDE PHOTONICS ON A SILICON PHOTONIC PLATFORM

(71) Applicant: Raytheon BBN Technologies Corp., Cambridge, MA (US)

(72) Inventors: Moe Soltani, Belmont, MA (US); Thomas Kazior, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 267 days.

(21) Appl. No.: 16/953,574

(22) Filed: Nov. 20, 2020

(65) Prior Publication Data

US 2021/0157178 A1 May 27, 2021

Related U.S. Application Data

(60) Provisional application No. 62/939,352, filed on Nov. 22, 2019.

(51) Int. Cl.
*G01F 1/05* (2006.01)
*G02F 1/055* (2006.01)
*G02F 1/015* (2006.01)

(52) U.S. Cl.
CPC .......... *G02F 1/0553* (2013.01); *G02F 1/0154* (2021.01); *G02F 1/0551* (2013.01); *G02F 2201/063* (2013.01); *G02F 2201/58* (2013.01); *G02F 2202/108* (2013.01); *G02F 2203/58* (2013.01)

(58) Field of Classification Search
CPC .... G02F 1/0553; G02F 1/0154; G02F 1/0551; G02F 2202/063; G02F 2202/58; G02F 2202/108; G02F 2203/58
See application file for complete search history.

(56) References Cited

U.S. PATENT DOCUMENTS 5,300,789 A * 4/1994 Gorfinkel ............... B82Y 20/00
257/15
5,521,994 A * 5/1996 Takeuchi ............... H01L 31/109
385/14
5,574,742 A * 11/1996 Ben-Michael ....... G02B 6/1228
372/45.01

(Continued)

FOREIGN PATENT DOCUMENTS

CN 209044108 U 6/2019
GB 2441790 A 3/2008
JP 2003152264 A 5/2003

OTHER PUBLICATIONS

International Search Report and Written Opinion in International Patent Application No. PCT/US2020/061436 dated Mar. 1, 2021.

(Continued)

*Primary Examiner* — Peter Radkowski
(74) *Attorney, Agent, or Firm* — Lando & Anastasi, LLP

(57) ABSTRACT

A photonic integrated circuit comprises a silicon nitride waveguide, an electro-optic modulator formed of a III-nitride waveguide structure disposed on the silicon nitride waveguide, a dielectric cladding covering the silicon nitride waveguide and electro-optic modulator, and electrical contacts disposed on the dielectric cladding and arranged to apply an electric field to the electro-optic modulator.

16 Claims, 22 Drawing Sheets

(56) References Cited

U.S. PATENT DOCUMENTS

| | | | | |
|---|---|---|---|---|
| 6,310,995 | B1* | 10/2001 | Saini | G02B 6/1228 385/39 |
| 6,483,863 | B2* | 11/2002 | Forrest | H01S 5/0265 372/50.1 |
| 7,302,124 | B2* | 11/2007 | Forrest | G02B 6/12004 385/14 |
| 7,333,689 | B2* | 2/2008 | Menon | H01S 5/1082 385/28 |
| 7,343,061 | B2* | 3/2008 | Forrest | G02B 6/1228 372/50.21 |
| 7,359,588 | B2* | 4/2008 | Kang | G02B 6/1228 385/27 |
| 7,373,048 | B2* | 5/2008 | Xia | G02B 6/1228 359/341.1 |
| 7,539,373 | B1* | 5/2009 | Logvin | G02B 6/14 385/28 |
| 7,688,870 | B2* | 3/2010 | Oh | H01L 33/0045 372/1 |
| 7,920,322 | B2* | 4/2011 | Oh | H01S 5/026 257/14 |
| 8,107,508 | B2* | 1/2012 | Oh | H01S 5/14 372/50.1 |
| 8,149,891 | B2* | 4/2012 | Funabashi | G02B 6/42 372/50.12 |
| 8,363,314 | B2* | 1/2013 | Oh | H01S 5/227 359/344 |
| 8,816,376 | B2* | 8/2014 | Ohno | H01L 33/0045 257/98 |
| 8,860,164 | B2* | 10/2014 | Takabayashi | H01L 27/1443 257/466 |
| 8,895,335 | B1* | 11/2014 | Wierer, Jr. | H01L 21/0242 438/45 |
| 9,136,672 | B2* | 9/2015 | Luo | B82Y 20/00 |
| 9,147,781 | B2* | 9/2015 | Takabayashi | H01L 27/146 |
| 9,368,677 | B2* | 6/2016 | Wierer, Jr. | H01L 31/03046 |
| 9,995,895 | B2* | 6/2018 | Hofrichter | H01S 5/1032 |
| 10,444,433 | B1* | 10/2019 | Bian | G02B 6/136 |
| 10,483,716 | B2* | 11/2019 | Menezo | H01S 5/125 |
| 10,591,671 | B2* | 3/2020 | Lin | G02B 6/1228 |
| 2002/0031297 | A1* | 3/2002 | Forrest | B82Y 20/00 359/344 |
| 2002/0097941 | A1* | 7/2002 | Forrest | H01S 5/0265 385/14 |
| 2005/0185889 | A1* | 8/2005 | Xia | H01S 5/5009 385/28 |
| 2006/0126987 | A1* | 6/2006 | Kang | G02F 1/01708 385/2 |
| 2006/0165143 | A1* | 7/2006 | Ohno | H01S 5/2231 372/46.015 |
| 2007/0077017 | A1* | 4/2007 | Menon | H01S 5/162 359/344 |
| 2007/0110357 | A1* | 5/2007 | Forrest | H01L 31/02327 385/28 |
| 2008/0137180 | A1* | 6/2008 | Oh | H01L 33/0045 359/344 |
| 2009/0154514 | A1* | 6/2009 | Oh | H01S 5/50 372/45.011 |
| 2010/0215072 | A1* | 8/2010 | Funabashi | G02B 6/42 257/E31.127 |
| 2010/0238962 | A1* | 9/2010 | Oh | H01S 5/14 |
| 2011/0150406 | A1* | 6/2011 | Oh | H01S 5/50 385/130 |
| 2013/0292723 | A1* | 11/2013 | Ohno | H01L 33/58 257/98 |
| 2014/0153600 | A1* | 6/2014 | Luo | B82Y 20/00 372/40 |
| 2014/0175589 | A1* | 6/2014 | Takabayashi | H01L 27/1443 257/432 |
| 2016/0131837 | A1* | 5/2016 | Mahgerefteh | G02B 6/125 385/14 |
| 2016/0252692 | A1* | 9/2016 | Hofrichter | H01S 3/091 250/227.11 |
| 2018/0212399 | A1* | 7/2018 | Menezo | H01S 5/125 |
| 2019/0137688 | A1* | 5/2019 | Lin | G02B 6/1228 |

OTHER PUBLICATIONS

Blumenthal, D. J., et al., "Silicon nitride in silicon photonics," Proceedings of the IEEE (2018) vol. 106, No. 12, pp. 2209-2231.

Chang, L., et al., "Heterogeneous integration of lithium niobate and silicon nitride waveguides for wafer-scale photonic integrated circuits on silicon" Optics Letters (2017) vol. 42, No. 4, pp. 803-806.

Chen, H., et al., "Low loss GaN waveguides at the visible spectral wavelengths for integrated photonics applications," Optics Express (2017) vol. 25, No. 25, pp. 31758-31773.

Gao, X., et al., "Monolithic III-nitride photonic integration toward multifunctional devices" Optics Letters (2017) vol. 42, No. 23, pp. 4853-4856.

Hosseini, E., et al., "High quality planar silicon nitride microdisk resonators for integrated photonics in the visible wavelength range," Optics Express (2009) vol. 17, No. 17, pp. 14543-14551.

Li, H. K., et al., "Monolithically integrated InGaN/GaN light-emitting diodes, photodetectors, and waveguides on Si substrate," Optica (2018) vol. 5, No. 5, pp. 564-569.

Li, J., et al., "Growth of III-nitride photonic structures on large area silicon substrates," Applied Physics Letters 88, 171909 (2006).

Porcel, M. A. G., et al., "Silicon nitride photonic integration for visible light applications," Optics and Laser Technology 112 (2019) pp. 299-306.

Rabiei, P., et al., "Heterogeneous lithium niobate photonics on silicon substrates," Optics Express (2013) vol. 21, No. 21, pp. 25573-25581.

Soltani, M., et al., "AlGaN/AlN integrated photonics platform for the ultraviolet and visible spectral range," Optics Express (2016) vol. 24, No. 22, pp. 25415-25423.

Stassen, E., et al., "High-confinement gallium nitride-on-sapphire waveguides for integrated nonlinear photonics" Optics Letters (2019) vol. 44, No. 5, pp. 1064-1067.

Triviño, N.V., et al., "Gallium nitride L3 photonic crystal cavities with an average quality factor of 16900 in the near infrared," Applied Physics Letters 105, 231119 (2014).

Xiong, C., et al., "Integrated GaN photonic circuits on silicon (100) for second harmonic generation" Optics Express (2011) vol. 19, No. 11, pp. 10462-10470.

Xiong, C., et al., "Integrated Photonic Circuits in Gallium Nitride and Aluminum Nitride," International Journal of High Speed Electronics and Systems (2014) vol. 23, No. 1, pp. 1450001-1-1450001-8.

Zhang, C., et al., "Ultralinear heterogeneously integrated ring-assisted Mach-Zehnder interferometer modulator on silicon," Optica (2016) vol. 3, No. 12, pp. 1483-1488.

* cited by examiner ns on a silicon nitride waveguide and silicon nitride
HETEROGENOUS INTEGRATION AND ELECTRO-OPTIC MODULATION OF III-NITRIDE PHOTONICS ON A SILICON PHOTONIC PLATFORM

CROSS-REFERENCE TO RELATED APPLICATIONS

This application claims priority under 35 U.S.C. § 119(e) to U.S. Provisional Patent Application Ser. No. 62/939,352, titled HETEROGENOUS INTEGRATION AND ELECTRO-OPTIC MODULATION OF III-NITRIDE PHOTONICS ON A SILICON PHOTONIC PLATFORM, filed Nov. 22, 2019, that is incorporated herein in its entirety for all purposes.

BACKGROUND

Photonic Integrated Circuits (PIC) are a technology platform for routing and processing of optical frequencies at chip-scales for a broad range of applications including sensing, signal processing, computing, metrology, and communications. A fruitful well-developed PIC technology is silicon photonics which has found applications mainly at infrared wavelengths with a broad range of active components including efficient electro-optic modulators and passive waveguiding circuitries. Since silicon is absorptive at visible wavelengths, silicon waveguides cannot be made to guide light in the visible range. An optical waveguiding material that is still compatible with silicon photonics and widely used in this platform is silicon nitride which is transparent over a wide wavelength range including the visible range. Nevertheless, silicon nitride is a passive material meaning that active components such as fast (GHz speed) electro-optic modulators cannot be made with this material.

SUMMARY

Aspects and embodiments disclosed herein include integration of III-nitride photonic materials (e.g., AlGaN, GaN) on silicon nitride photonics on a silicon platform to enable an active platform working over a broad wavelength range including the visible range. Passive optical circuitry includes silicon nitride waveguides while active components such as electro-optic modulators are made with III-nitride photonic circuitry bonded to the silicon nitride waveguide circuitry. Aspects and embodiments may be particularly beneficial for developing a photonic integrated circuit (PIC) platform operable in the visible range having efficient active and passive functionalities.

In accordance with one aspect, there is provided a photonic integrated circuit. The photonic integrated circuit comprises a silicon nitride waveguide, an electro-optic modulator formed of a III-nitride waveguide structure disposed on the silicon nitride waveguide, a dielectric cladding covering the silicon nitride waveguide and electro-optic modulator, and electrical contacts disposed on the dielectric cladding and arranged to apply an electric field to the electro-optic modulator.

In some embodiments, the III-nitride waveguide structure is formed of one of $Al_xGa_{1-x}N$ ($0 \leq x \leq 1$), $In_xGa_{1-x}N$ ($0 \leq x \leq 1$), or $Al_xIn_{1-x}N$ ($0 \leq x \leq 1$).

In some embodiments, the III-nitride waveguide structure includes a stacked layer of quantum wells formed of one of $Al_xGa_{1-x}N$ ($0 \leq x \leq 1$), $In_xGa_{1-x}N$ ($0 \leq x \leq 1$), or $Al_xIn_{1-x}N$ ($0 \leq x \leq 1$).

In some embodiments, the III-nitride waveguide structure is bonded to the silicon nitride waveguide and silicon nitride support layers with a III-nitride slab.

In some embodiments, the dielectric cladding is formed of silicon dioxide.

In some embodiments, the silicon nitride waveguide is disposed on an upper surface of a silicon dioxide layer disposed on a silicon substrate.

In some embodiments, the photonic integrated circuit further comprises one or more heterogeneously integrated III-nitride quantum well modulators.

In some embodiments, the photonic integrated circuit further comprises a photodetector.

In some embodiments, the photodetector is optically coupled to the silicon nitride waveguide.

In some embodiments, the photodetector is disposed on a same side of the silicon nitride waveguide as the dielectric cladding.

In some embodiments, the photodetector is disposed on a opposite side of the silicon nitride waveguide as the dielectric cladding.

In some embodiments, the photonic integrated circuit further comprises a conductive via passing through the dielectric cladding and forming an electrical path between a contact pad of the photodetector and an external contact pad disposed on a surface of the dielectric cladding.

In some embodiments, the photonic integrated circuit further comprises a conductive via passing through the dielectric cladding and forming an electrical path between the III-nitride waveguide structure and an external contact pad disposed on a surface of the dielectric cladding.

In some embodiments, the III-nitride waveguide structure has a tapered end portion.

In accordance with another aspect, there is provided a method of forming a photonic integrated circuit. The method comprises forming a silicon nitride waveguide on a first substrate, forming an electro-optic modulator including a III-nitride waveguide structure on a second substrate, bonding the electro-optic modulator to the silicon nitride waveguide, and removing the second substrate.

In some embodiments, the method further comprises fabricating one or more III-nitride quantum well modulators in the photonic integrated circuit.

In some embodiments, the method further comprises forming a tapered end portion on the III-nitride waveguide structure.

In some embodiments, the method further comprises forming a dielectric cladding over the silicon nitride waveguide and electro-optic modulator.

In some embodiments, the method further comprises forming a conductive via electrically connected to the III-nitride waveguide structure and passing through the dielectric cladding.

In some embodiments, the method further comprises forming a photodetector optically coupled to the silicon nitride waveguide within the photonic integrated circuit.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
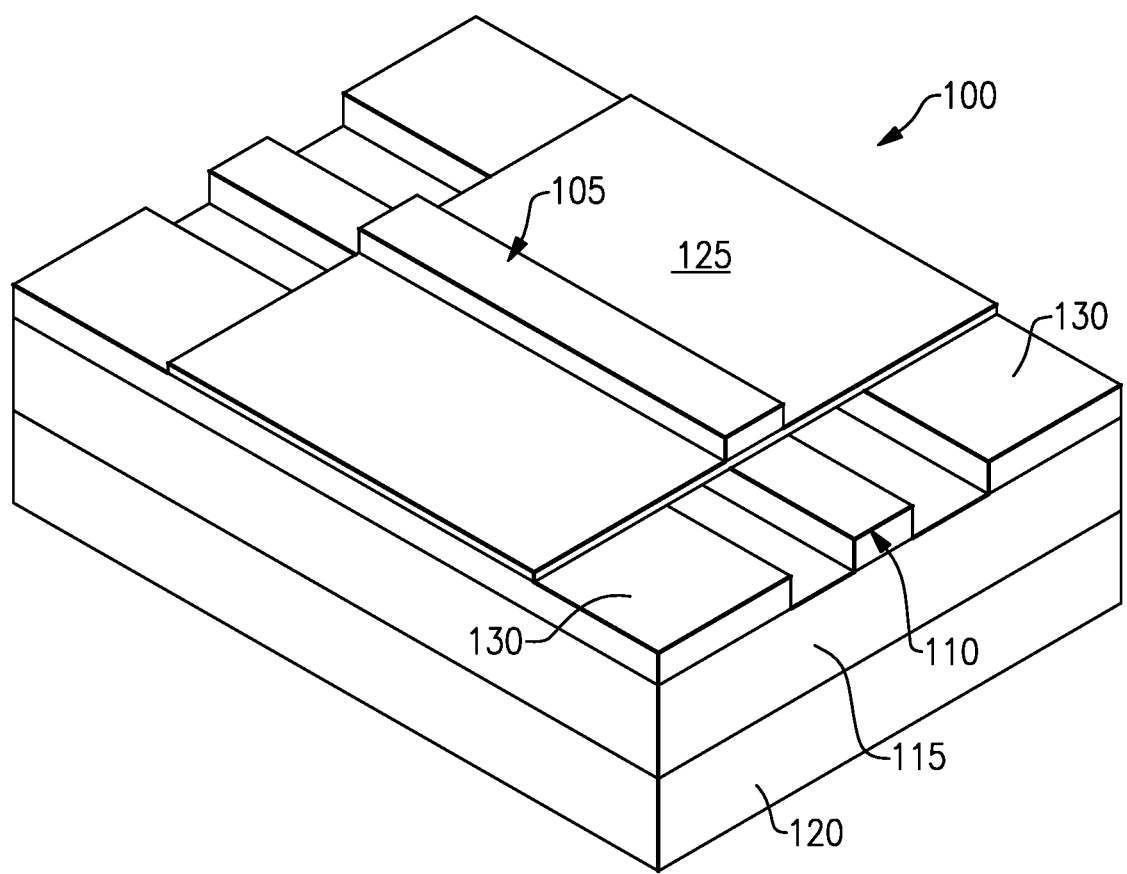
FIG. 1 is a partial isometric view of an embodiment of a photonic integrated circuit.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

The relatively inexpensive silicon platform for photonic integrated circuits (PIC) and the well-understood and inexpensive nature of silicon microfabrication processes motivates the heterogeneous integration of other photonic materials that are transparent in the visible spectrum and have active electro-optic properties on silicon. For example heterogeneous integration of III-V (e.g., indium phosphide compounds) photonics platforms on silicon or heterogeneous integration of lithium niobate on silicon or silicon nitride have been demonstrated successfully but mainly for applications in infrared and have limited functionality at visible wavelengths, or cannot handle large optical powers in the visible wavelengths (for example lithium niobate suffers from photorefractive damage at wavelengths shorter than red wavelengths when laser power goes to mW range.)

III-nitride photonics compound materials which include, for example, $Al_xGa_{1-x}N$ (x=0-1), $In_xGa_{1-x}N$ (x=0-1), and $Al_xIn_{1-x}N$ (x=0-1) are example of promising materials that are transparent over a wide wavelength range including the visible range with promising and proven active photonic properties making them useful in devices such as electro-optic modulators and lasers. Some of these platforms may be disposed on a sapphire substrate which does not have the benefits of silicon substrate such as low cost or high-volume production. Other implementations may include depositing aluminum nitride on a $SiO_2$ cladding in which the aluminum nitride is not crystalline and so exhibits large optical propagation loss in the visible range. Some implementations may include bonding GaN on $SiO_2$ to form GaN waveguides on the $SiO_2$ cladding on a Si substrate. Further implementations may involve direct growing of III-nitrides on silicon for making cheaper light-emitting diodes. Such platforms, however, are not suitable for photonic integrated circuits that require appropriate refractive index contrast between different material layers to form optical waveguides with low optical propagation loss. There has been work directed to making photonic integrated circuits of III-nitride on a silicon platform. The problem with such a platform is the higher refractive index of silicon which directly sits under the III-nitride layer and therefor causes the leakage of light from the III-nitride layer to the Si substrate. Some implementations may locally undercut the Si layer under the III-nitrides to make a III-nitride membrane waveguide with air underneath to avoid optical leakage. Undercutting, however, is not a viable solution for long length waveguides.

Aspects and embodiments disclosed herein include methods for heterogeneous integration of III-nitride photonic circuitries on silicon nitride waveguide circuitries which themselves are disposed on a silicon platform. Aspects and embodiments disclosed herein may provide a comprehensive integrated photonic platform that is functional over a wide wavelength range, particularly in the visible and near infrared, wherein the active functions such as high-speed electro-optic modulators are provide by the III-nitride part of the circuit, and the passive optical routing circuitry across entire chip is provided by silicon nitride waveguides and related components (e.g., resonators).

FIG. 1 illustrates a structure 100 that includes a III-nitride (e.g., $Al_xGa_{1-x}N$ (x=0-1 or 0<x<1), $In_xGa_{1-x}N$ (x=0-1 or 0<x<1), or $Al_xIn_{1-x}N$ (x=0-1 or 0<x<1)) waveguide 105 bonded to a silicon nitride (SiN) waveguide 110. The silicon nitride waveguide 110 is disposed on a layer of $SiO_2$ 115 which is itself disposed on a Si substrate 120. In some embodiments, the layer of $SiO_2$ 115 may be omitted and the SiN waveguide 110 may be disposed directly on the Si substrate 120. The SiN waveguide 110 may be, for example, between 150 nm and 200 nm thick. A thin III-nitride slab layer 125 may be provided to facilitate bonding between the III-nitride waveguide 105, the silicon nitride waveguide 110, and optional additional silicon nitride support layers 130. Optical intensity after propagating through a SiN waveguide 110 reaches the heterogeneous III-nitride on SiN waveguide 105, 110 and allows light to penetrate into the III-nitride waveguide 105. The reason for this efficient interaction is that the refractive index of SiN (~2) is close to that of III-nitride waveguides, allowing these waveguides to be efficiently mode matched.

Figure 2:
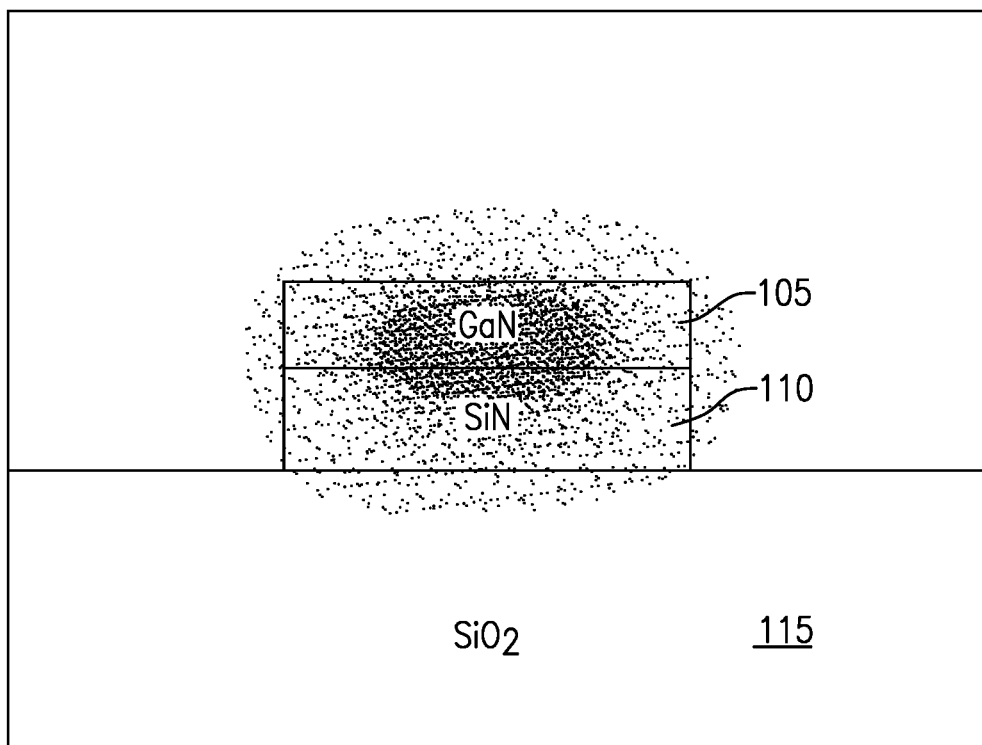
FIG. 2 illustrates results of a simulation of transmission of light through portions of the photonic integrated circuit of FIG. 1.

FIG. 2 illustrates results of a simulation that shows a III-nitride waveguide layer 105 and the SiN waveguide layer 110 as illustrated in FIG. 1 efficiently optically interacting as the optical energy exists in both layers. This simulation is for a wavelength of 532 nm and shows optical intensity interacting with both top and bottom waveguides 105, 110.

Silicon nitride is fully compatible with silicon and so most of the photonic waveguiding routing and circuitry can be done with SiN, and whenever active functionality such as efficient electro-optic modulation is needed, the optical signal is sent to the heterogeneous region including the III-nitride waveguide 105 and silicon nitride waveguide 110 shown in FIG. 2 for modulation purposes.

Figure 3:
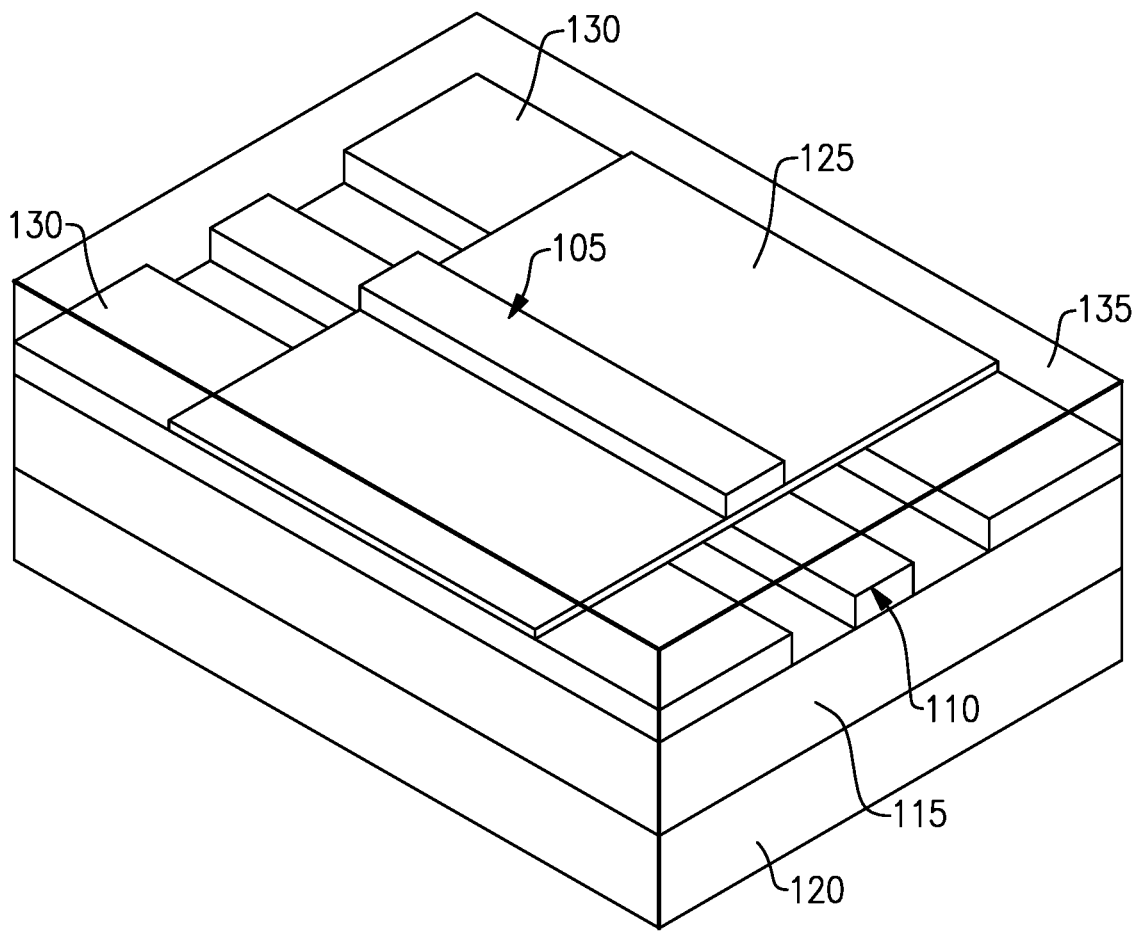
FIG. 3 is a partial isometric view of another embodiment of a photonic integrated circuit.
Figure 4:
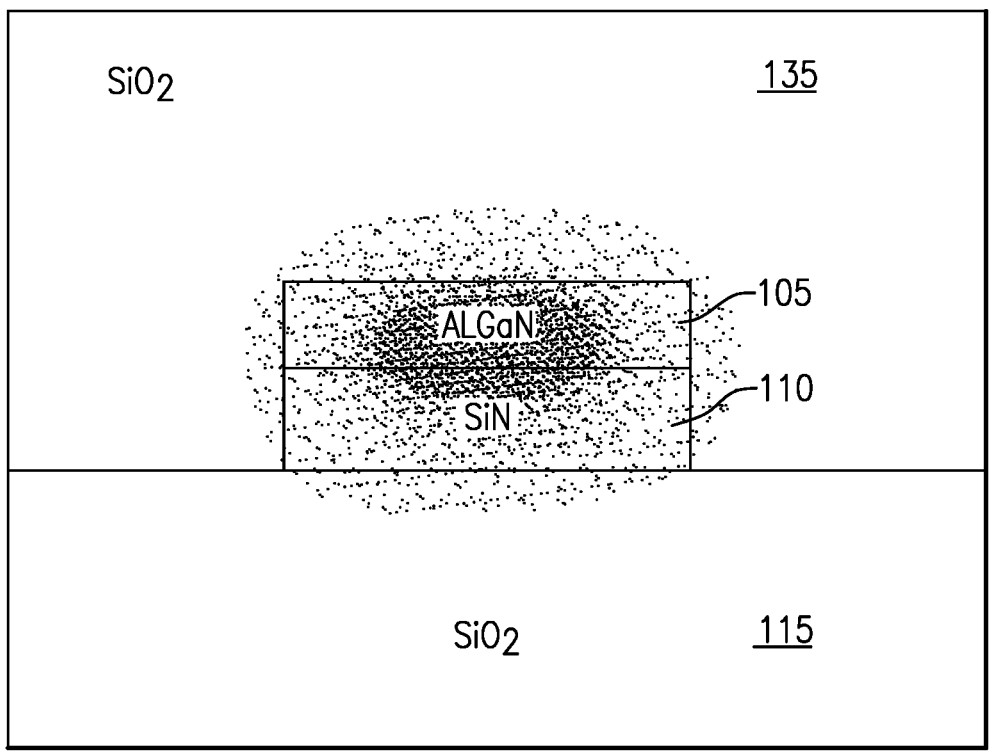
FIG. 4 illustrates results of a simulation of transmission of light through portions of the photonic integrated circuit of FIG. 3.

The structure in FIG. 1 represents a simple schematic to show one main concept of the present disclosure. As illustrated in FIG. 3, the structure of FIG. 1 may be cladded with other optical materials with a lower refractive index than that of SiN and III-nitride. One example of a cladding material which is compatible with silicon platform is $SiO_2$. FIG. 3 shows the same structure shown in FIG. 1, but with added $SiO_2$ overcladding 135. FIG. 4 illustrates results of a simulation of a III-nitride waveguide layer 105 and SiN waveguide layer 110 in a cladded structure as illustrated in FIG. 3 efficiently optically interacting as the optical energy exists in both layers.

Figure 5:
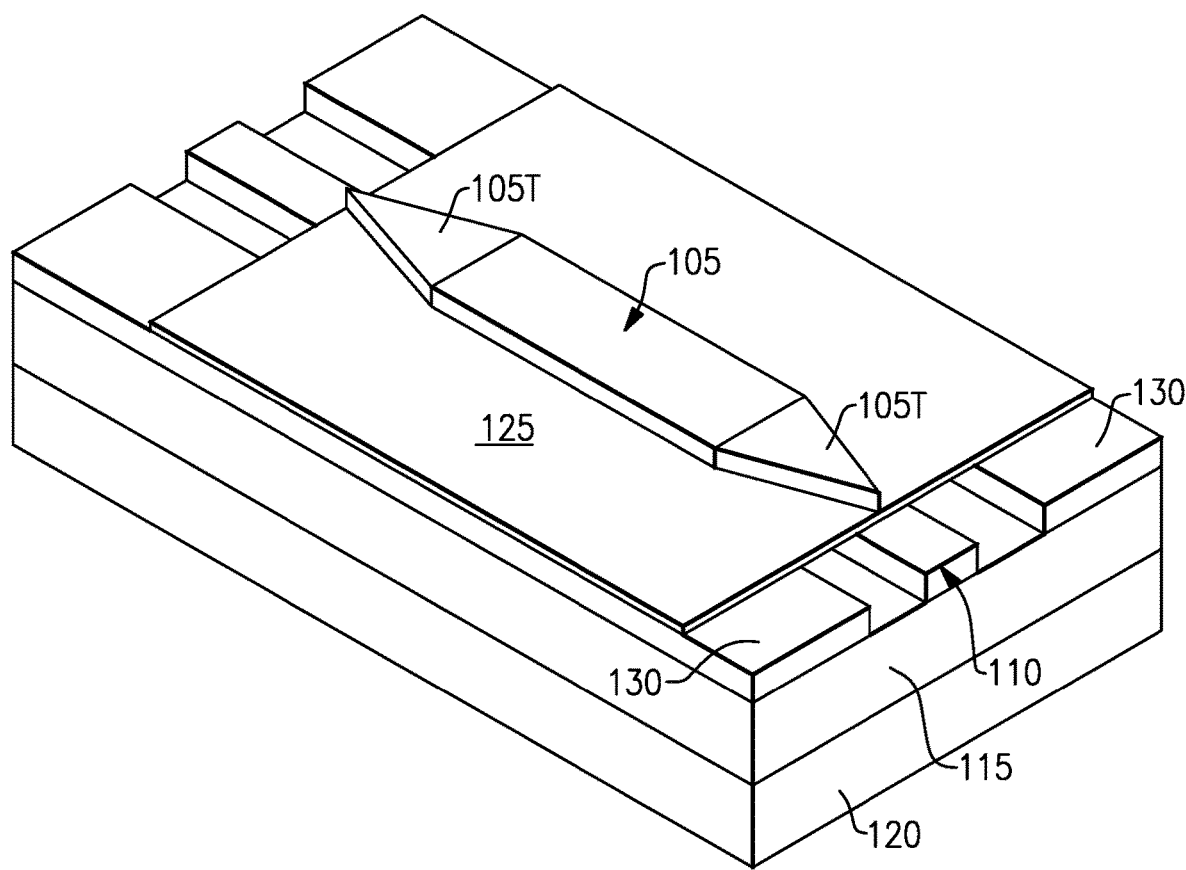
FIG. 5 is a partial isometric view of another embodiment of a photonic integrated circuit.
Figure 6:
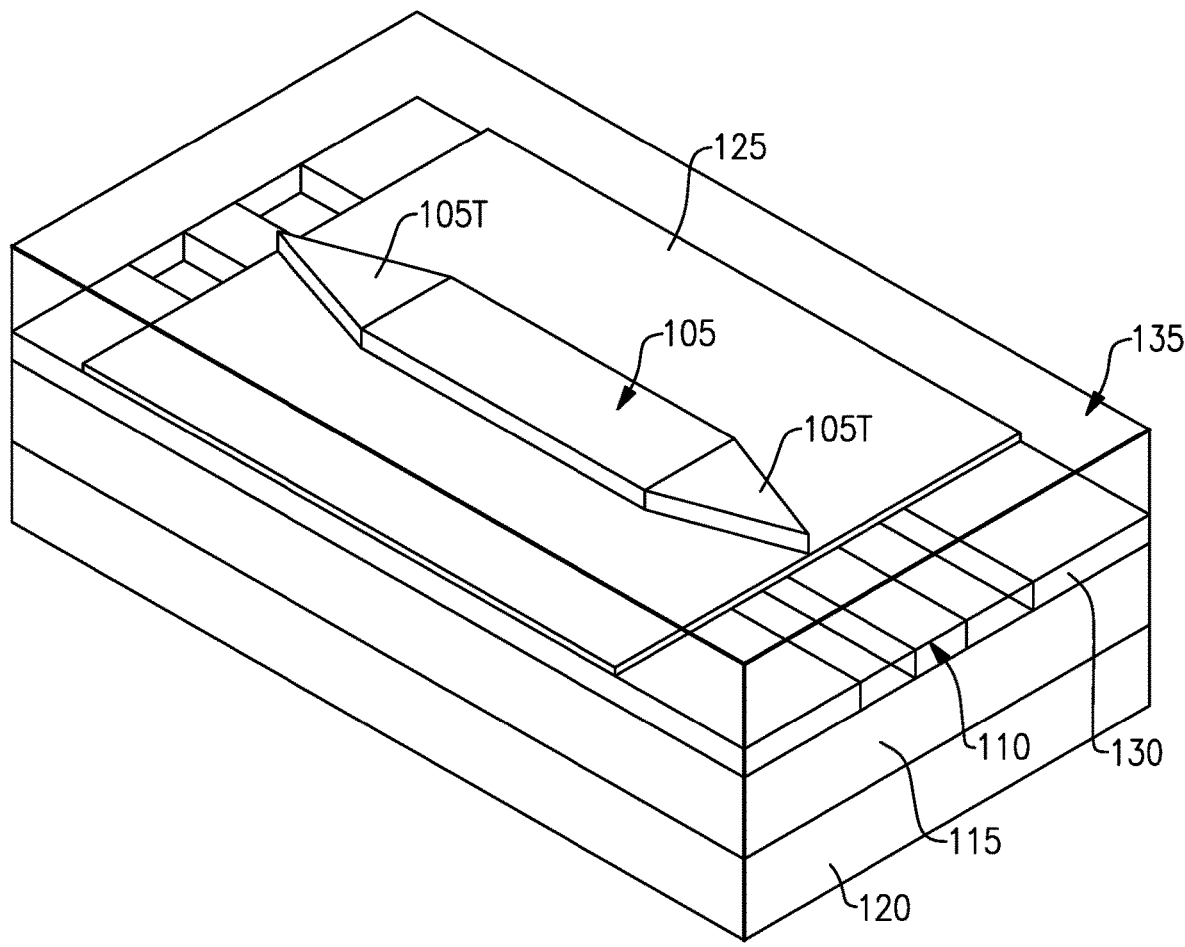
FIG. 6 is a partial isometric view of another embodiment of a photonic integrated circuit.

In some embodiments, for example, as illustrated in FIGS. 5 and 6, there are waveguide tapers 105T at the beginning and the end of the III-nitride waveguide 105 to allow adiabatic matching of the SiN waveguide layer 110 and the III-nitride waveguide layer 105. FIG. 5 illustrates this structure without $SiO_2$ overcladding 135 and FIG. 6 illustrates this structure with $SiO_2$ overcladding 135.

Figure 7:
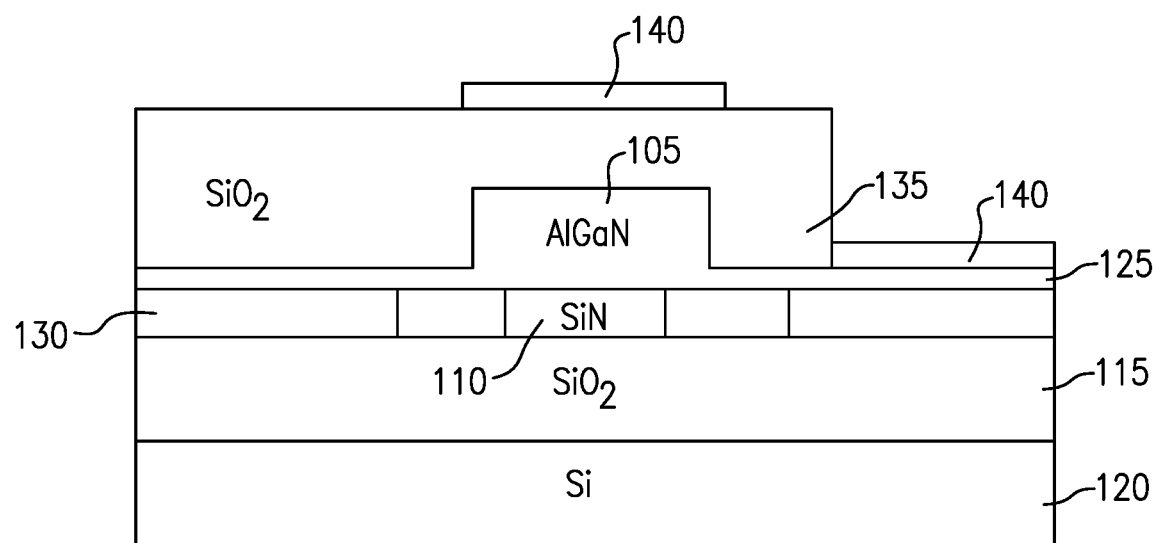
FIG. 7 is a partial cross-sectional view of another embodiment of a photonic integrated circuit.
Figure 8:
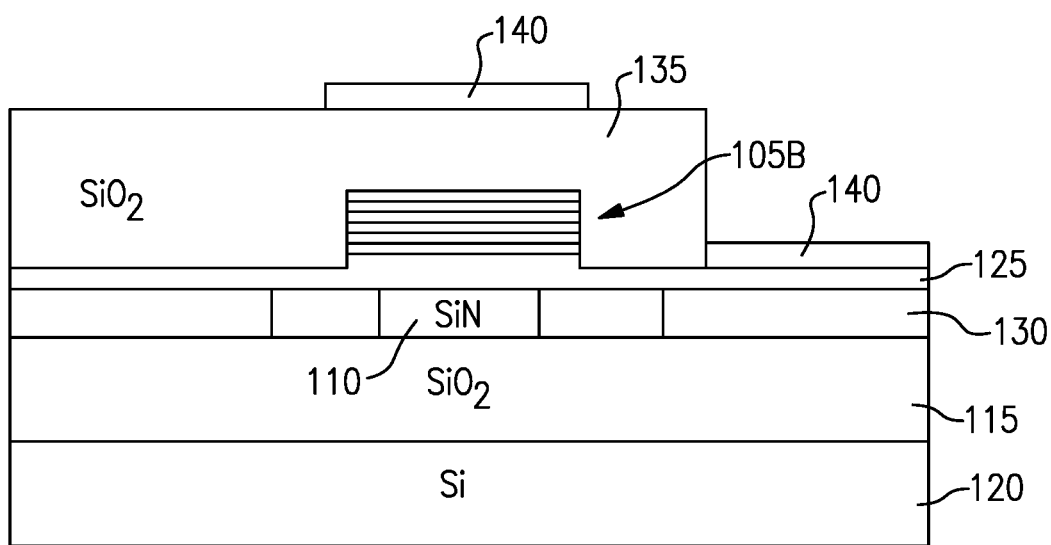
FIG. 8 is a partial cross-sectional view of another embodiment of a photonic integrated circuit.

Two waveguiding electro-optic modulator structures on a heterogeneous III-nitride on silicon nitride waveguiding platform are illustrated in cross sections in FIGS. 7 and 8, respectively. The modulator device shown in FIG. 7 works based on the known Pockels effect. There are metal electrodes 140 (e.g., Cu, Au, or Al) integrated with the III-nitride, e.g., AlGaN waveguide 105. By applying a voltage across the electrodes 140 an electric field penetrates into the AlGaN waveguide 105 and changes its refractive index resulting in a modulation of light traveling in the AlGaN waveguide 105. The structure shown in FIG. 8 also works based on Pockels effect but with the inclusion of III-nitride quantum well layers 105B to induce strain and therefore to strongly enhance the Pockels effect. The quantum well layers 105B can be a periodic stack of layers of AlGaN/GaN, or in general $Al_xGa_{1-x}N/Al_yGa_{1-y}N$ wherein x and y are the fraction of Al and Ga in AlGaN and vary between 0 and 1 and may add to 1 and where x≠y. The composition of Al and Ga can be anything between 0 and 1, but for sake of simplicity, throughout this disclosure the term AlGaN shall be considered to encompass any of $Al_xGa_{1-x}N$ (x=0-1 or 0<x<1), $In_xGa_{1-x}N$ (x=0-1 or 0<x<1), or $Al_xIn_{1-x}N$ (x=0-1 or 0<x<1). The stack of quantum well layers 105B can be made of any III-nitride family, for example, $Al_xGa_{1-x}N$ or $In_xGa_{1-x}N$, so long as the stack design provide the desired strain. The thickness of these stack quantum well layers may be, for example, between a few nm to about ten nm. The strain induced in the stack of quantum well layers 105B can strongly enhance the Pockels effect of III-nitride.

Figure 9A:
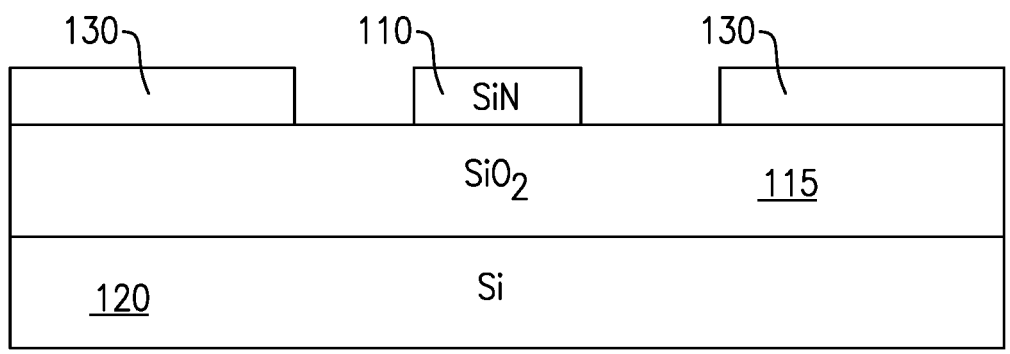
FIG. 9A illustrates an act in a process for forming a photonic integrated circuit as illustrated in FIG. 7 or FIG. 8.
Figure 9B:
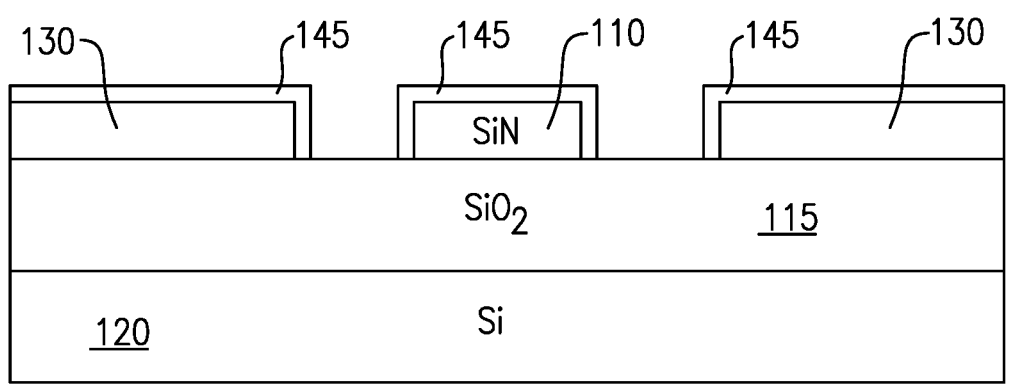
FIG. 9B illustrates another act in a process for forming a photonic integrated circuit as illustrated in FIG. 7 or FIG. 8.
Figure 10A:
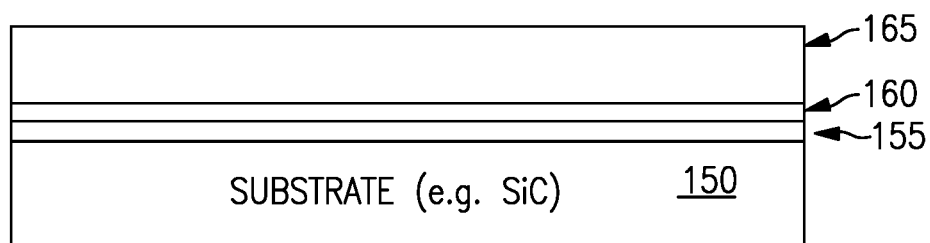
FIGS. 10A-10H illustrate acts in a process for forming a photonic integrated circuit as illustrated in FIG. 7.
Figure 10B:
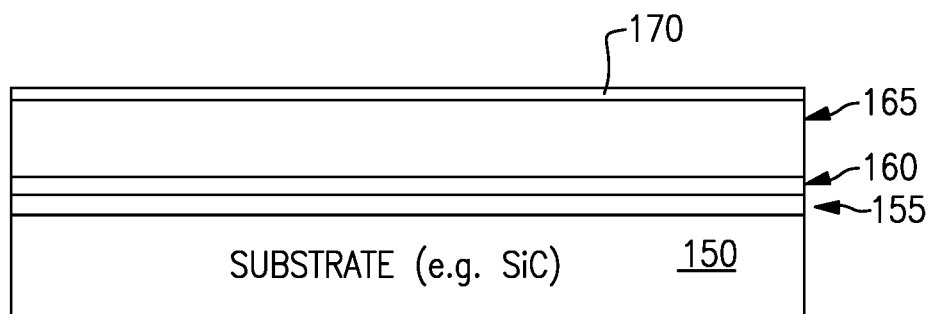
Figure 10C:
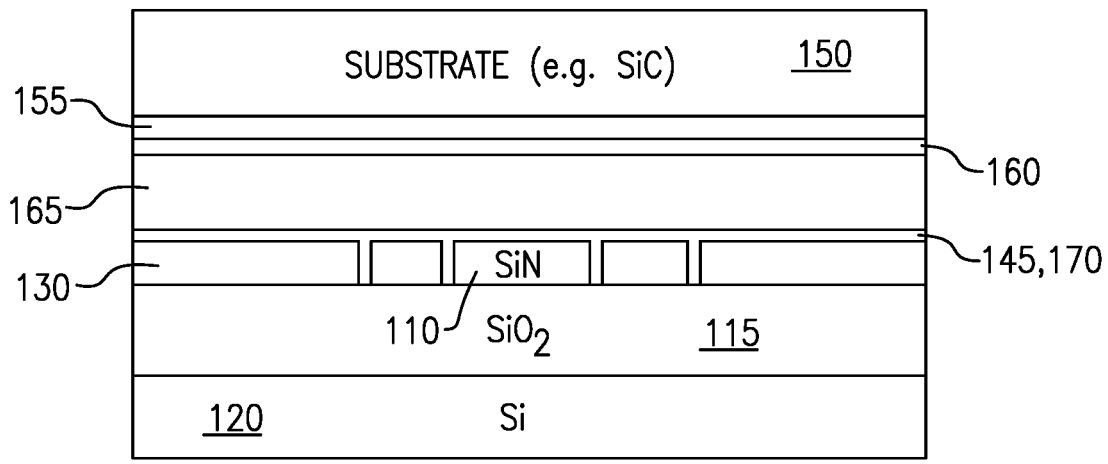
Figure 10D:
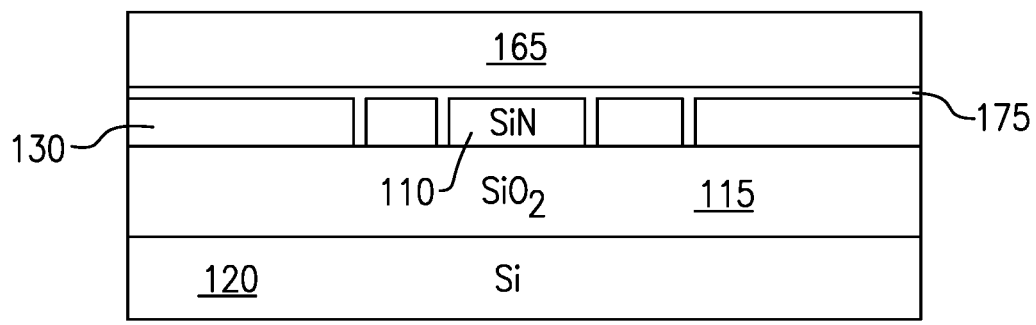
Figure 10E:
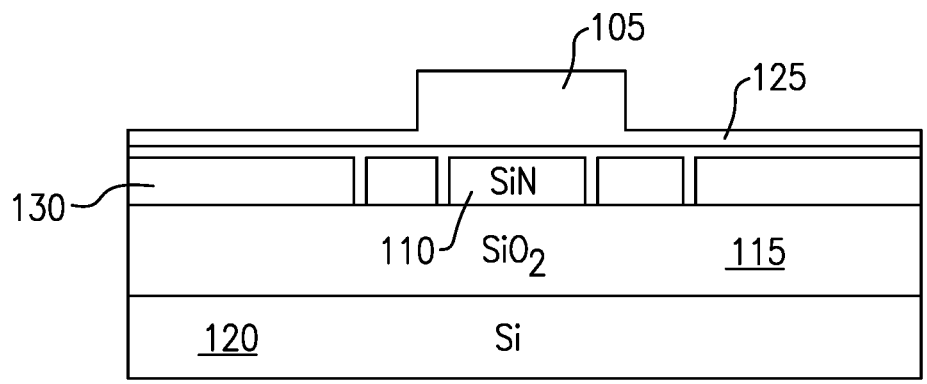
Figure 10F:
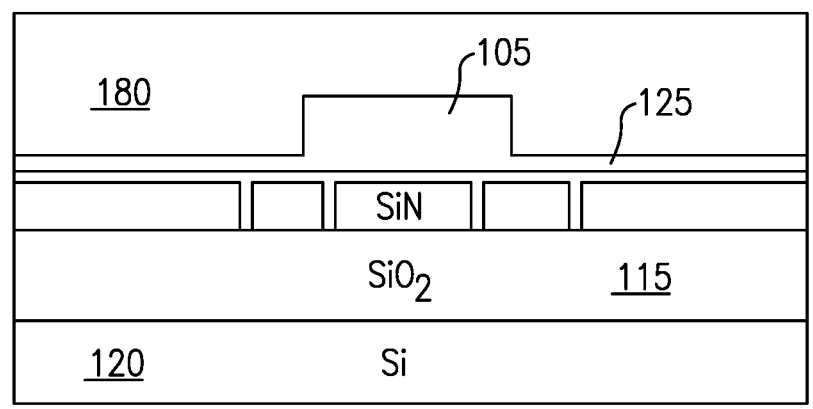
Figure 10G:
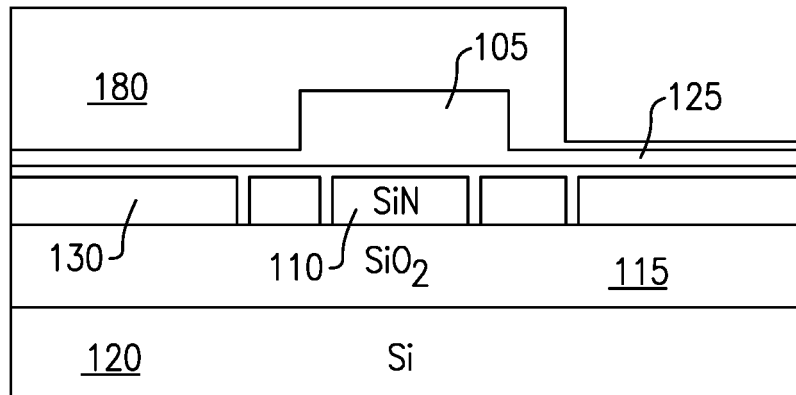
Figure 10H:
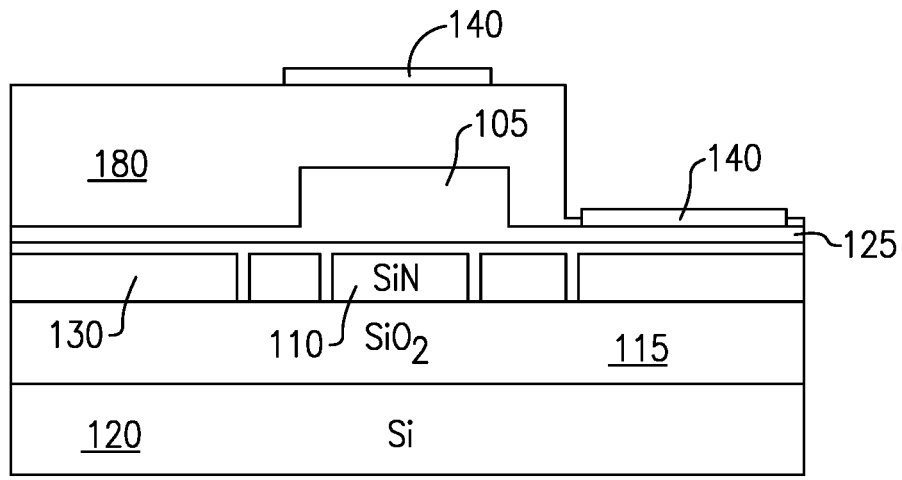

FIGS. 9A and 9B and 10A-10H show the general fabrication steps for making a heterogeneous integration of a III-nitride waveguide on a silicon nitride waveguide as well as making a Pockels electro-optic modulator as shown in FIG. 7. As illustrated in FIG. 9A a $SiO_2$ layer 115 is gown on a Si substrate 120 and a SiN waveguide 110 and support layers 130 are fabricated on the $SiO_2$ layer 115 using semiconductor fabrication techniques known in the art that will not be described in detail herein. A thin, for example, about 10 nm thick layer of $SiO_2$ may be grown or deposited on top of the SiN structures 110, 130 as illustrated in FIG. 9B. The thin $SiO_2$ layer may assist in bonding the SiN waveguide 110 and support layers 130 to the AlGaN waveguide structure as will be described in further detail below. Concurrent with, prior to, or after forming the SiN waveguide structure one may form an AlGaN structure from which the AlGaN waveguide will be formed. As illustrated in FIG. 10A, a layer of AlGaN 165 may be epitaxially grown on a template substrate 150, for example, a SiC substrate or substrate of any other suitable material using known techniques in the semiconductor fabrication arts. The template substrate 150 may be coated with a nucleation layer 155 and a highly doped AlGaN layer 160 disposed on the nucleation layer 155 prior to epitaxial growth of the AlGaN layer 165 on the highly doped AlGaN layer 160. A thin, for example, about 10 nm thick layer of $SiO_2$ 170 may be grown or deposited on the top of the layer of AlGaN 165 as illustrated in FIG. 10B. As illustrated in FIG. 10C, the AlGaN structure including the AlGaN layer 165 is flipped over and the oxide layer 170 is brought into contact with the oxide layer 145 on the SiN structures 110, 130 of the SiN waveguide structure. The $SiO_2$ layers 145, 170 are bonded using an oxide-oxide bonding process, for example, anodic boding to form an adhesion layer 175 (FIG. 10D). A wet etching process is then used to remove the substrate 150, nucleation layer 155, and highly-doped AlGaN layer 160. The wet etchant used may selectively etch the highly doped AlGaN layer 160 versus the AlGaN layer 165 leaving the AlGaN layer 165 and resulting in the structure illustrated in FIG. 10D. Lithography and plasma etching as known in the art of semiconductor fabrication are then utilized to etch portions of the AlGaN layer 165 to form the AlGaN waveguide 105 and AlGaN slab layer 125 as illustrated in FIG. 10E. A layer of $SiO_2$ 180 is then grown or deposited on top of the AlGaN waveguide 105 and AlGaN slab layer 125 and optionally planarized (FIG. 10F). A portion of the layer of $SiO_2$ 180 is lithographically patterned and etch to expose a portion of the AlGaN slab layer 125 (FIG. 10G). Metal contacts 140 are then deposited using, for example, sputtering and photolithographic patterning with one metal contact 140 being on top of the $SiO_2$ layer above the AlGaN waveguide 105 and the other on the portion of exposed AlGaN slab layer 125, or on a thin $SiO_2$ layer that may remain on the AlGaN slab layer 125.

Figure 11A:
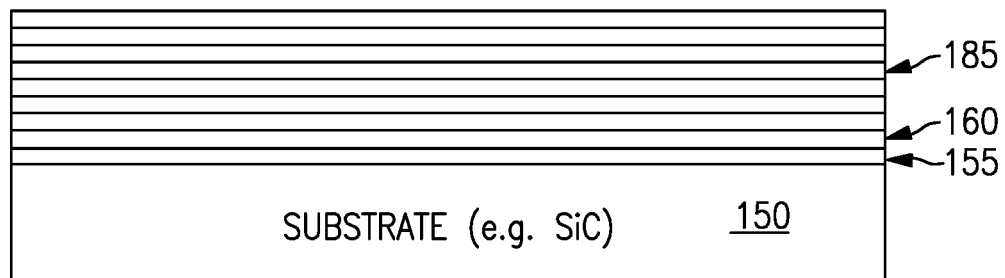
FIGS. 11A-11H illustrate acts in a process for forming a photonic integrated circuit as illustrated in FIG. 8.
Figure 11B:
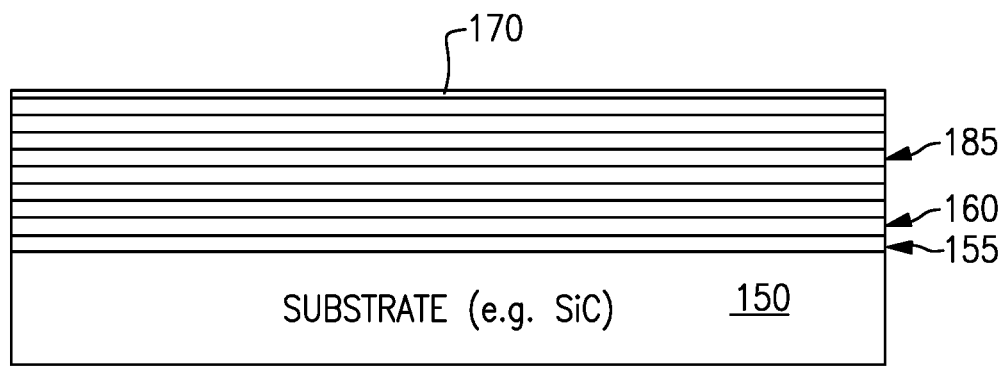
Figure 11C:
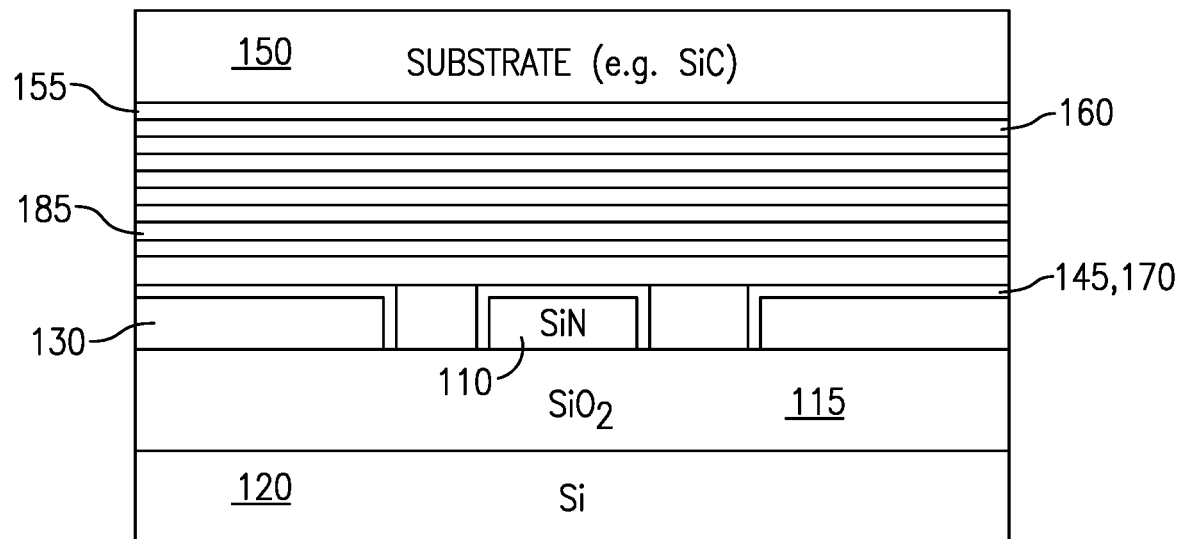
Figure 11D:
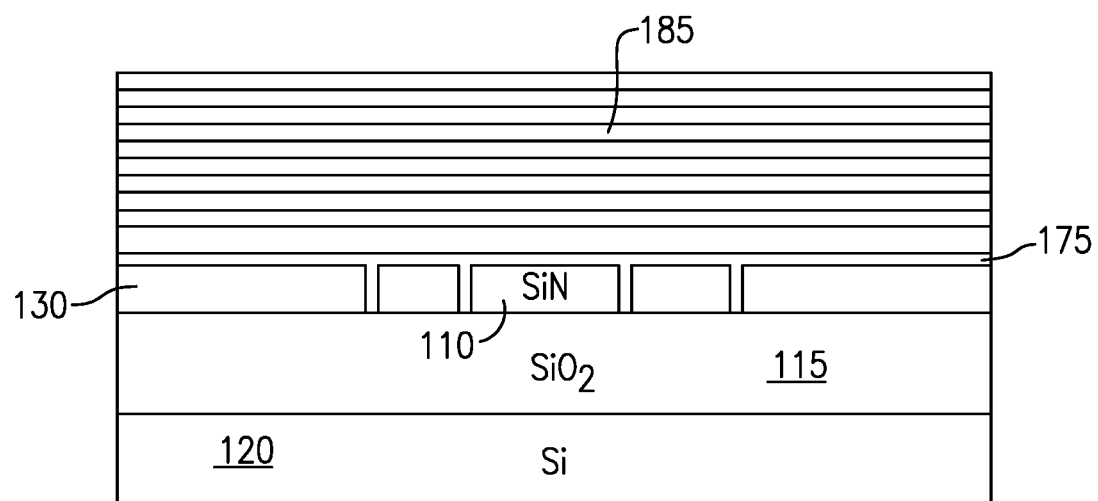
Figure 11E:
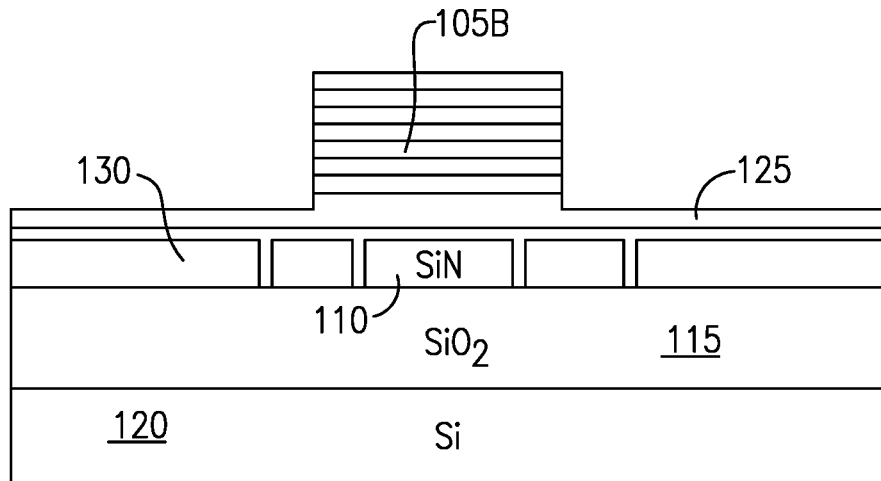
Figure 11F:
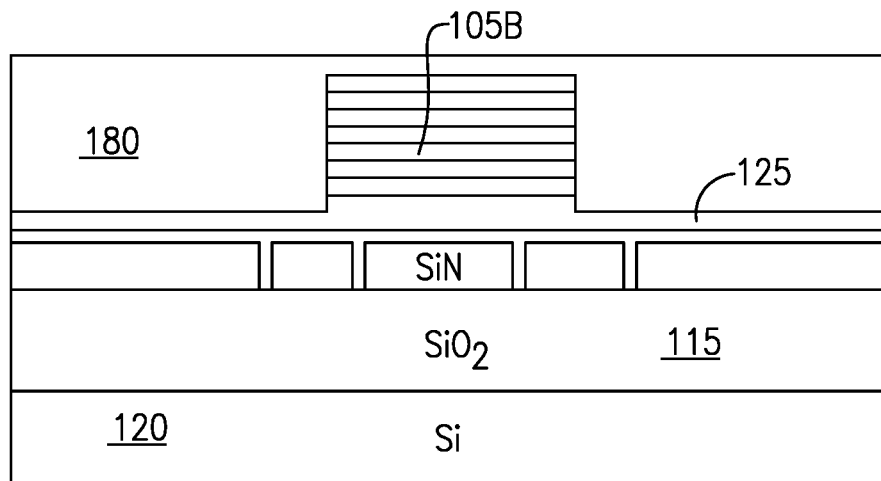
Figure 11G:
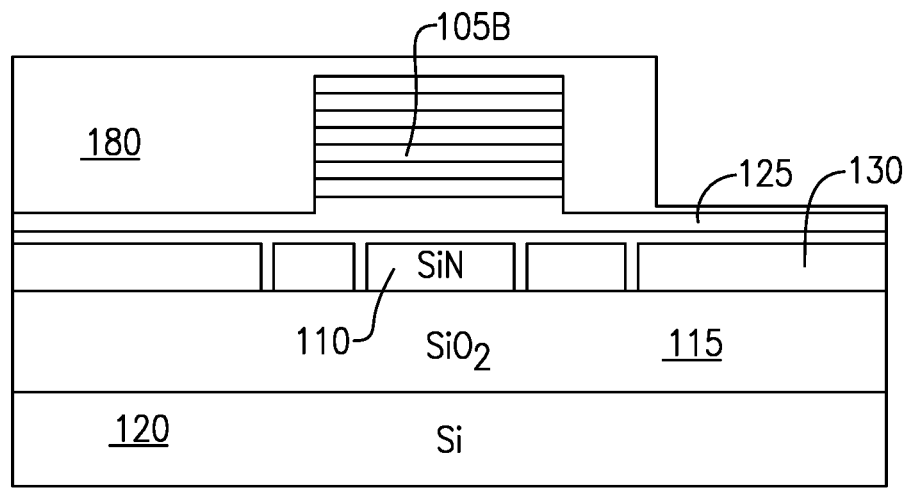
Figure 11H:
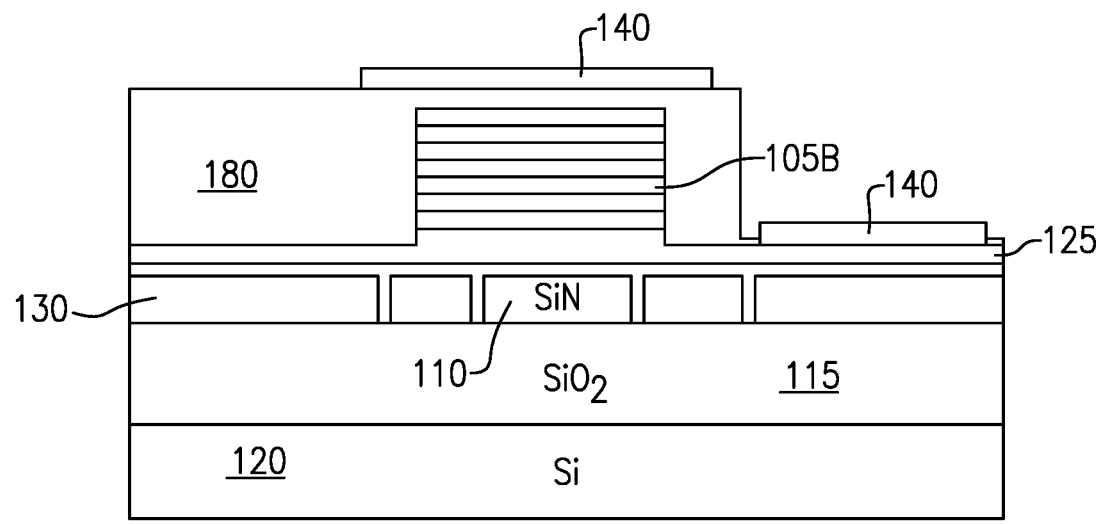

FIGS. 9A and 9B and 11A-11H shows the general fabrication steps for making a heterogeneous integration of III-nitride waveguide with layer of stacked AlGaN quantum wells forming a Pockels electro-optic modulator on a silicon nitride waveguide as shown in FIG. 8. As illustrated in FIG. 9A a $SiO_2$ layer 115 is gown on a Si substrate 120 and a SiN waveguide 110 and support layers 130 are fabricated on the SiO₂ layer 115 using semiconductor fabrication techniques known in the art that will not be described in detail herein. A thin, for example, about 10 nm thick layer of SiO₂ may be grown or deposited on top of the SiN structures 110, 130 as illustrated in FIG. 9B. The thin SiO₂ layer may assist in bonding the SiN waveguide 110 and support layers 130 to the stacked AlGaN quantum well waveguide structure as will be described in further detail below. Concurrent with, prior to, or after forming the SiN waveguide structure one may form an AlGaN structure from which the AlGaN quantum well waveguide and AlGaN slab layer will be formed. As illustrated in FIG. 11A, a layer 185 including a stack of AlGaN quantum wells may be epitaxially grown on a template substrate 150, for example, a SiC substrate or substrate of any other suitable material using known techniques in the semiconductor fabrication arts. The template substrate 150 may be coated with a nucleation layer 155 and a highly doped AlGaN layer 160 disposed on the nucleation layer 155 prior to epitaxial growth of the AlGaN quantum well layer 185 on the highly doped AlGaN layer 160. A thin, for example, about 10 nm thick layer of SiO₂ 170 may be grown or deposited on the top of the layer of AlGaN quantum wells 185 as illustrated in FIG. 11B. As illustrated in FIG. 11C, the AlGaN structure including the AlGaN quantum well layer 185 is flipped over and the oxide layer 170 is brought into contact with the oxide layer 145 on the SiN structures 110, 130 of the SiN waveguide structure. The SiO₂ layers 145, 170 are bonded using an oxide-oxide bonding process, for example, anodic boding to form an adhesion layer 175 (FIG. 11D). A wet etching process is then used to remove the substrate 150, nucleation layer 155, and highly doped AlGaN layer 160. The wet etchant used may selectively etch the highly doped AlGaN layer 160 versus the AlGaN quantum well layer stack 185 leaving the AlGaN quantum well layer stack 185 and resulting in the structure illustrated in FIG. 11D. Lithography and plasma etching as known in the art of semiconductor fabrication are then utilized to etch portions of the AlGaN quantum well layer stack 185 to form the AlGaN quantum well layer waveguide 105B and AlGaN slab layer 125 as illustrated in FIG. 11E. A layer of SiO₂ 180 is then grown or deposited on top of the AlGaN quantum well layer waveguide 105B and AlGaN slab layer 125 and optionally planarized (FIG. 11F). A portion of the layer of SiO₂ 180 is lithographically patterned and etched to expose a portion of the AlGaN slab layer 125 (FIG. 11G). Metal contacts 140 are then deposited using, for example, sputtering and photolithographic patterning with one metal contact 140 being on top of the SiO₂ layer above the AlGaN quantum well layer waveguide 105B and the other on the portion of exposed AlGaN slab layer 125, or on a thin SiO₂ layer that may remain on the AlGaN slab layer 125.

Figure 12:
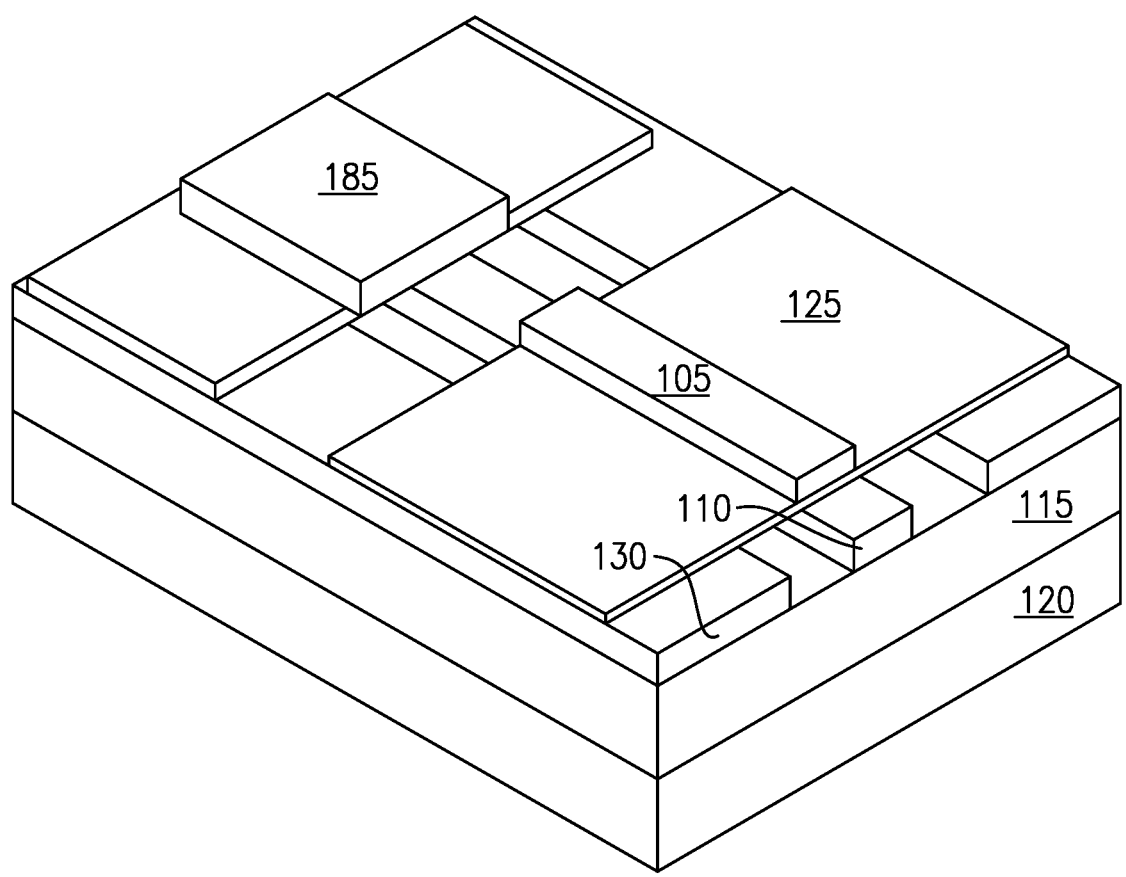
FIG. 12 is a partial isometric view of another embodiment of a photonic integrated circuit.

In some aspects, additional circuitry or active or passive devices may be integrated with or formed on the embodiments of the waveguide structures disclosed herein. For example, as illustrated in FIG. 12, in one embodiment, a photodetector such as an on-chip Si photodetector 185 may be mounted on the waveguide structure 100. The on-chip Si photodetector 185 may optically couple to the SiN waveguide 110 and produce an output signal based on the presence or absence of light passing through the SiN waveguide 110. In other embodiment, one or more III-nitride quantum well lasers can also or alternatively be heterogeneously integrated and fabricated in embodiments of the waveguide structures disclosed herein in a similar way to the modulator structure with the stacked AlGaN quantum wells 105B.

Figure 13A:
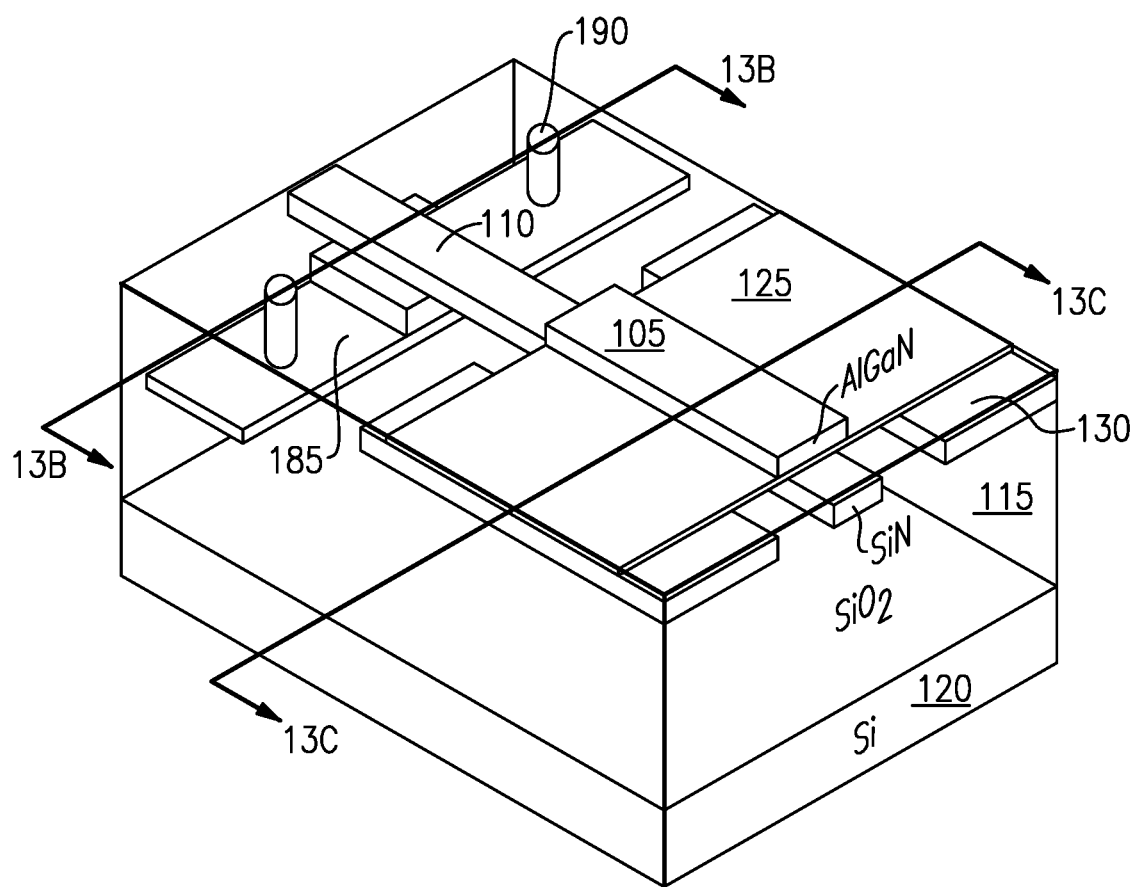
FIG. 13A is a partial isometric view of another embodiment of a photonic integrated circuit.
Figure 13B:
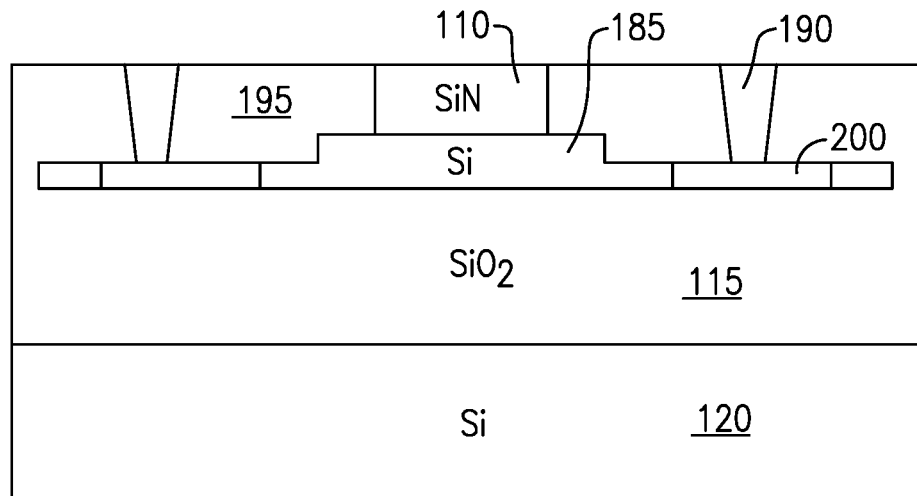
FIG. 13B is a cross section through a portion of the photonic integrated circuit of FIG. 13A.
Figure 13C:
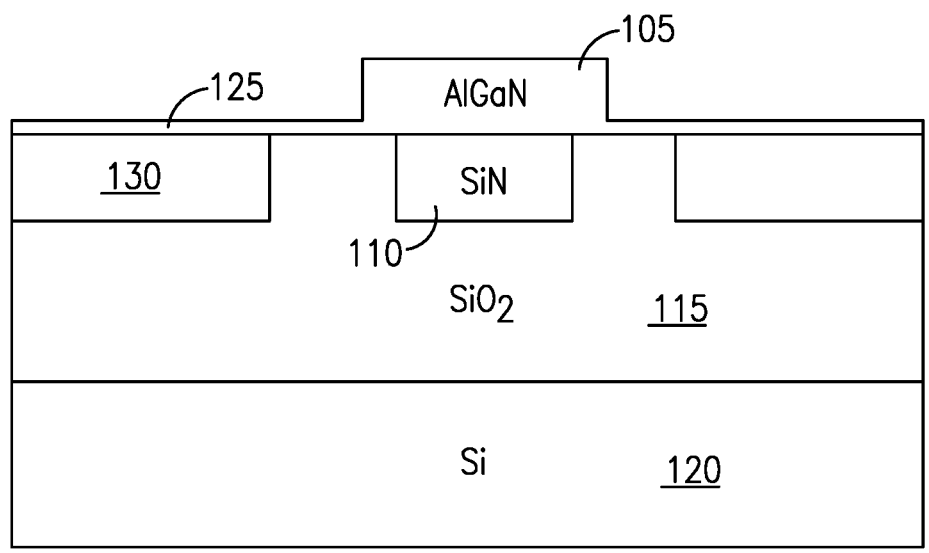
FIG. 13C is a cross section through another portion of the photonic integrated circuit of FIG. 13A.

FIGS. 13A-13C illustrate an alternative to the photonic integrated circuit of FIG. 12. In the embodiment of FIGS. 13A-13C, the on-chip Si detector 185 is formed below the SiN waveguide 110, rather than above the SiN waveguide 110 as illustrated in FIG. 12. Also illustrated in FIGS. 13A and 13B are vias 190 that may pass through a layer of dielectric 195, for example, SiO₂ that covers the on-chip Si detector 185. Layer of dielectric 195 may be a portion of the layer of SiO₂ 115 disposed on the Si substrate 120. The vias 190 electrically connect to contact pads 200 on the on-chip Si detector 185 so that electrical signals from the on-chip Si detector 185 may be passed out of the photonic integrated circuit. The vias 190 may be formed of a metal, for example, Al or Cu or another suitable conductive material.

Figure 14A:
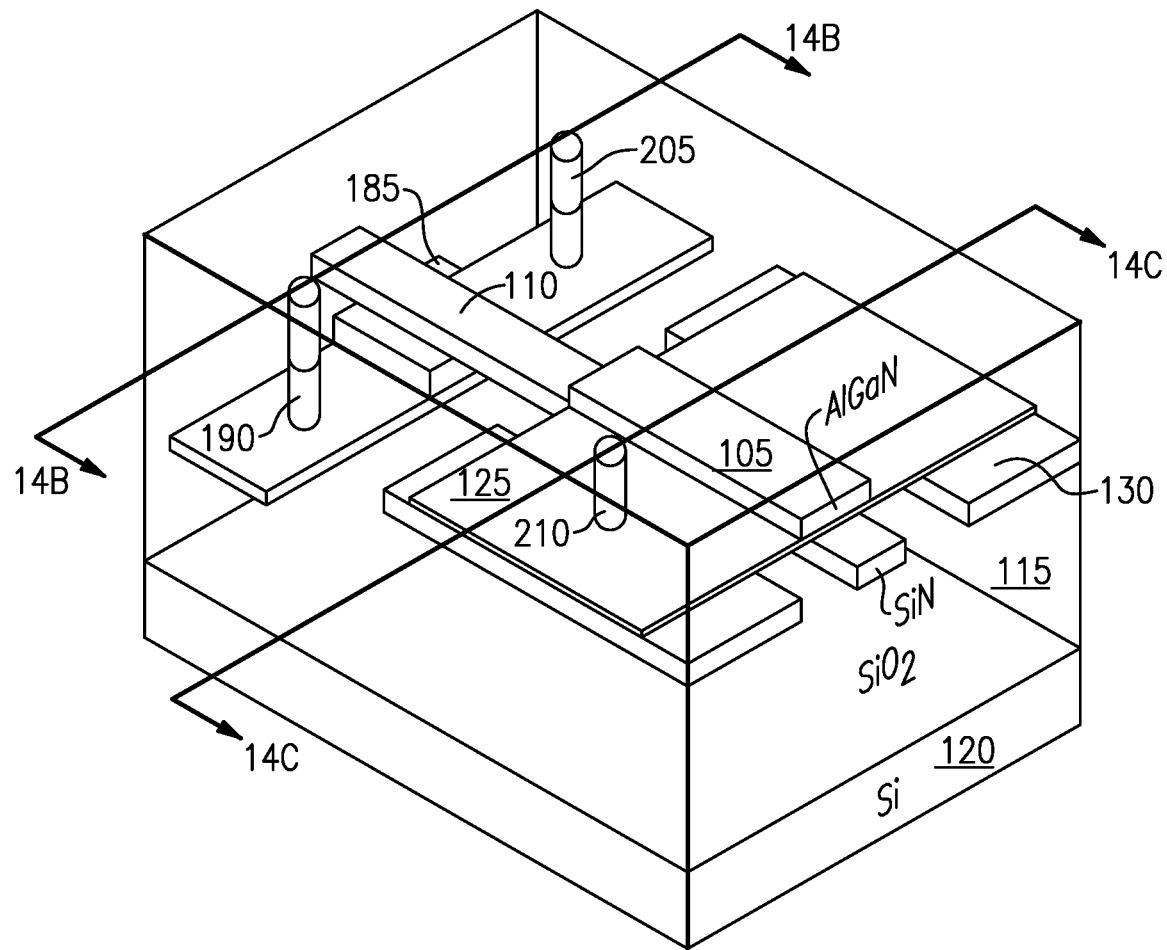
FIG. 14A is a partial isometric view of another embodiment of a photonic integrated circuit.
Figure 14B:
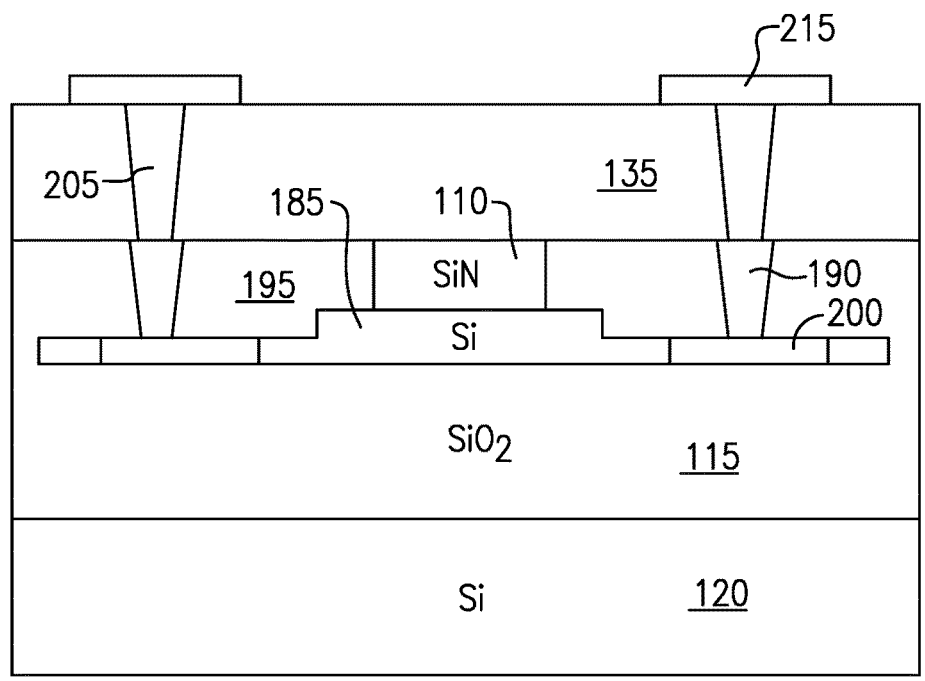
FIG. 14B is a cross section through a portion of the photonic integrated circuit of FIG. 14A.
Figure 14C:
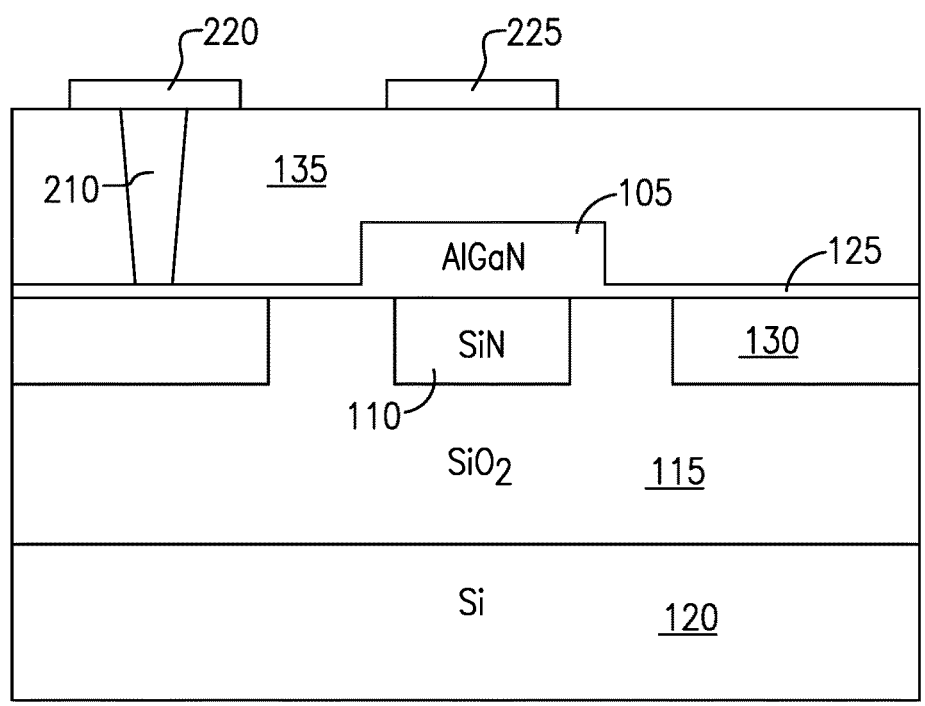
FIG. 14C is a cross section through another portion of the photonic integrated circuit of FIG. 14A.

As illustrated in FIGS. 14A-14C, an overcladding layer 135 formed of, for example SiO₂ may be disposed over the AlGaN 105 and SiN 110 waveguides of the structure of FIGS. 13A-13C and may serve to protect the waveguides. Second layer vias 205 may be formed over and in electrical connection with the vias 190. The second layer vias 205 provide for electrical signals from the on-chip Si detector 185 may be passed through the overcladding layer 135 and out of the photonic integrated circuit. An additional via 210 may pass through the overcladding layer 135 and electrically connect to the AlGaN waveguide 105, for example, to the slab layer 125 of the AlGaN waveguide 105. Second layer vias 205 and the AlGaN waveguide via 210 may be formed of a metal, for example, Al or Cu or another suitable conductive material. Second layer vias 205 and the AlGaN waveguide via 210 may electrically connect to respective contact pads 215, 220 disposed on top of the overcladding layer 135. An additional metal contact 225 may be provided on top of the overcladding layer 135 to allow one to apply an electric field to the AlGaN waveguide 105.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:
1. A photonic integrated circuit comprising:
   a silicon nitride waveguide;
   an electro-optic modulator formed of a III-nitride waveguide structure disposed on the silicon nitride waveguide, the III-nitride waveguide structure bonded to the silicon nitride waveguide with a III-nitride slab;
   a silicon dioxide layer disposed on a substrate, the silicon nitride waveguide disposed on the silicon dioxide layer beneath the III-nitride waveguide, the III-nitride slab supported above the silicon dioxide layer by the silicon nitride waveguide and by silicon nitride support layers disposed on the silicon dioxide layer and separated laterally from the silicon nitride waveguide in a direction perpendicular to a direction of light passage through the silicon nitride waveguide and III-nitride waveguide;
   a dielectric cladding covering the silicon nitride waveguide and electro-optic modulator; and
   electrical contacts disposed on the dielectric cladding and arranged to apply an electric field to the electro-optic modulator.

2. The photonic integrated circuit of claim 1, wherein the III-nitride waveguide structure is formed of one of $Al_xGa_{1-x}N$ (0≤x≤1), $In_xGa_{1-x}N$ (0≤x≤1), or $Al_xIn_{1-x}N$ (0≤x≤1).

3. The photonic integrated circuit of claim 1, wherein the III-nitride waveguide structure includes a stacked layer of quantum wells formed of one of $Al_xGa_{1-z}N$ (0≤x≤1), $In_xGa_{1-z}N$ (0≤x≤1), or $Al_xIn_{1-z}N$ (0≤x≤1).

4. The photonic integrated circuit of claim 1, wherein the III-nitride waveguide structure is bonded to the silicon nitride waveguide and the silicon nitride support layers with the III-nitride slab.

5. The photonic integrated circuit of claim 1, wherein the dielectric cladding is formed of silicon dioxide.

6. The photonic integrated circuit of claim 1, further comprising one or more heterogeneously integrated III-nitride quantum well modulators.

7. The photonic integrated circuit of claim 1, further comprising a photodetector.

8. The photonic integrated circuit of claim 7, wherein the photodetector is optically coupled to the silicon nitride waveguide.

9. The photonic integrated circuit of claim 7, wherein the photodetector is disposed on a same side of the silicon nitride waveguide as the dielectric cladding.

10. The photonic integrated circuit of claim 7, wherein the photodetector is disposed on a opposite side of the silicon nitride waveguide as the dielectric cladding.

11. The photonic integrated circuit of claim 7, further comprising a conductive via passing through the dielectric cladding and forming an electrical path between a contact pad of the photodetector and an external contact pad disposed on a surface of the dielectric cladding.

12. The photonic integrated circuit of claim 1, further comprising a conductive via passing through the dielectric cladding and forming an electrical path between the III-nitride waveguide structure and an external contact pad disposed on a surface of the dielectric cladding.

13. The photonic integrated circuit of claim 1, wherein the III-nitride waveguide structure has a tapered end portion.

14. The photonic integrated circuit of claim 1, wherein the III-nitride waveguide is wider than the silicon nitride waveguide.

15. The photonic integrated circuit of claim 1, wherein the III-nitride waveguide has greater height than the III-nitride slab.

16. The photonic integrated circuit of claim 1, further comprising a layer of silicon dioxide disposed between the III-nitride slab and the silicon nitride waveguide.

* * * * *